United States Patent [19]

Reed

[11] 3,878,612

[45] Apr. 22, 1975

[54] ARRANGEMENT FOR OBTAINING DISTANCE TRAVELED AND GROUND SPEED OF AN AIRCRAFT

[76] Inventor: James B. Reed, 1132 Foothill, Santa Ana, Calif. 92705

[22] Filed: Oct. 17, 1972

[21] Appl. No.: 298,400

[52] U.S. Cl.................. 33/1 SD; 33/1 R; 235/78
[51] Int. Cl.............................. G06g 1/00
[58] Field of Search......... 33/1 R, 1 B, 1 CC, 1 MP, 33/1 SB, 1 SD, 274; 235/83, 78

[56] References Cited
UNITED STATES PATENTS

| | | | |
|---|---|---|---|
| 1,665,527 | 4/1928 | Brinkman | 33/274 |
| 2,481,846 | 9/1949 | King | 235/83 |
| 2,991,555 | 7/1961 | Cambiaso | 33/1 SD |
| 3,621,578 | 11/1971 | Novakovic | 33/1 SB |
| 3,690,009 | 9/1972 | Henley | 33/1 MP |

OTHER PUBLICATIONS
Zweng, Charles A., Flying the Omnirange, Pan American Navigational Service, 1950, p. 70.

*Primary Examiner*—Richard E. Aegerter
*Assistant Examiner*—Richard R. Stearns
*Attorney, Agent, or Firm*—Gausewitz, Carr & Rothenberg

[57] ABSTRACT

An arrangement for obtaining the distance traveled and ground speed of an aircraft, in which the distance of the course of the aircraft perpendicularly to an omnirange station is obtained, the distance along said course between adjacent points at predetermined angular positions relative to the omnirange station is obtained, and the elapsed time between the angular positions is obtained to obtain velocity by division, the invention including an indicating device having a rotor within a compass card, the rotor indicating perpendicular diametrical directions, and a table of distances between angular positions relative to a point along lines spaced from the point and perpendicular to a line intersecting the point.

13 Claims, 4 Drawing Figures

ARRANGEMENT FOR OBTAINING DISTANCE TRAVELED AND GROUND SPEED OF AN AIRCRAFT

BACKGROUND OF THE INVENTION

1. The Field of the Invention

This invention pertains to aircraft navigation.

2. Description of Prior Art

Heretofore, there has been no simple and inexpensive arrangement for obtaining the ground speed of aircraft. Instrumentation currently available is quite costly and far beyond the reach of the average aircraft owner. Air speed indication is not a reliable means for determining ground speed because, obviously, wind encountered by the aircraft has a substantial effect upon its true velocity. Therefore, the pilots of most planes have had no way of establishing their actual progress toward their destinations. However, ground speed indication may be not merely a matter of convenience but also of vital importance to the pilot's safety.

SUMMARY OF THE INVENTION

The present invention provides a simple low-cost means of determining with considerable accuracy the distance traveled and true ground speed of an aircraft. It is used in conjunction with a conventional aeronautical chart, utilizing the signals of an omnirange station adjacent the course of the aircraft in such a way as to permit ground speed to be obtained. This is accomplished by finding the perpendicular distance from the aircraft's course to the omnirange station, and then establishing the distances between adjacent positions along the course at predetermined angles relative to the omnirange station. This enables the distance traversed to be found from the signals broadcast by the omnirange station. Then, by timing the flight of the aircraft along the course through a known distance, simple division provides actual ground velocity.

A pocket-size indicating device may be prepared which includes a circle divided into degrees and a rotor mounted within the circle. The rotor has a first diametrical line across it, as well as a second diametrical line perpendicular to the first. By setting the first line of the rotor on the bearing of the course, as shown on the aeronautical chart, the direction of a line perpendicular to the course will be given by the second line on the rotor. A line then is indicated on the aeronautical chart extending from the omnirange station at the angle of a line perpendicular to the course as established by the second line on the rotor, this line being projected to the course line. The perpendicular line is scaled off so that the perpendicular distance between the omnirange station and the course is known.

The device also includes a table which gives the distances between adjacent angular positions relative to a point along lines at established spaced distances from this point, which lines are perpendicular to a line intersecting the point. In the table, the point corresponds to the omnirange station, and the parallel lines correspond to course lines which may be followed. By choosing the line in the table spaced from the point the distance of the course from the omnirange station, the linear distances between established angular positions along the course are found. Then, the navigator of the plane merely observes the elapsed time in flying between adjacent angular positions corresponding to those of the table, and divides the distance shown in the table by the time to obtain velocity.

DESCRIPTION OF THE PREFERRED EMBODIMENT

Figure 1:
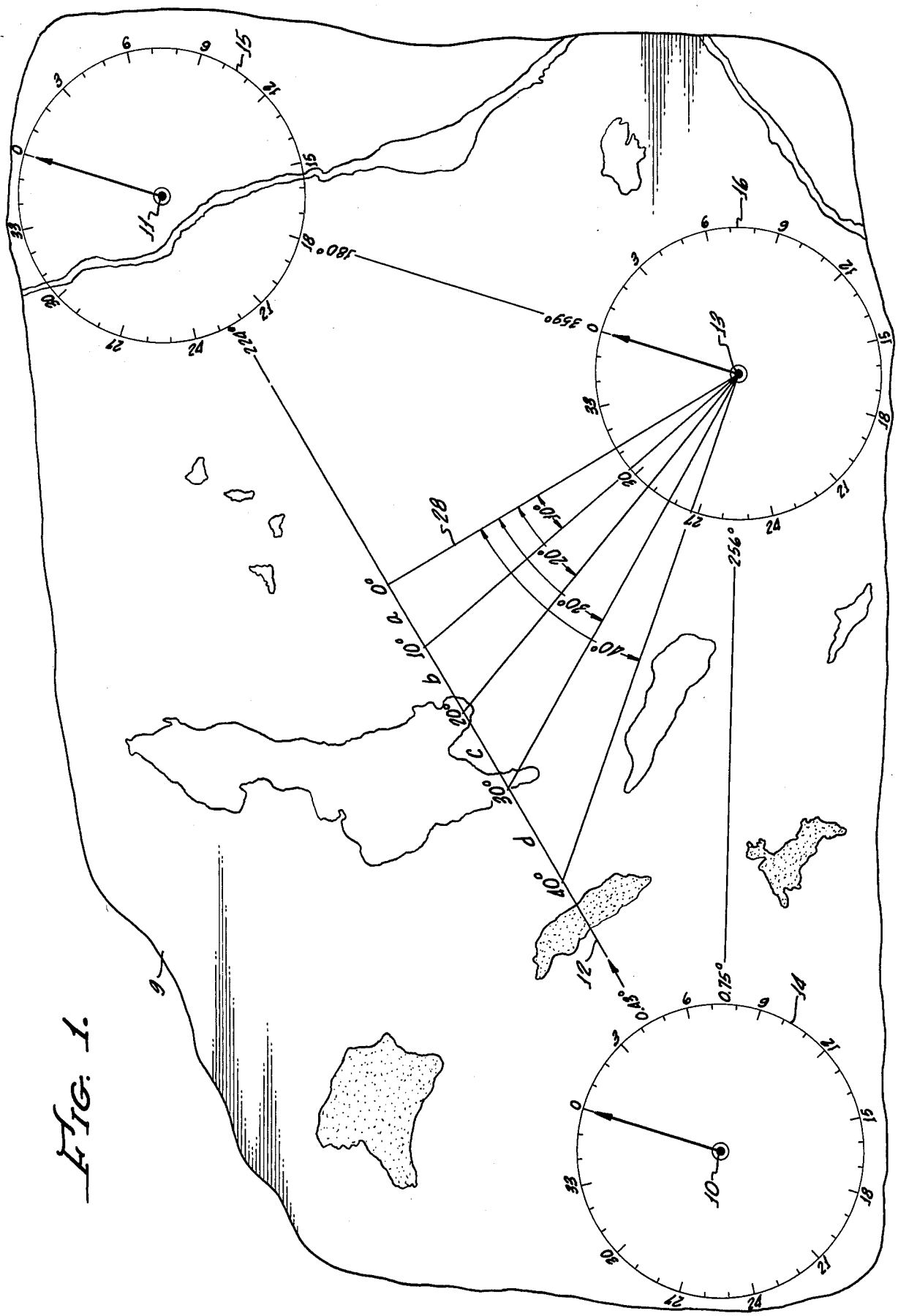
FIG. 1 is a plan view of a segment of an aeronautical chart used in conjunction with the present invention.

Shown in FIG. 1 is a portion of a typical aeronautical chart 9. Imprinted on this chart are specific locations 10 and 11, which may represent cities or towns, between which is a straight line 12 defining a navigational course for an aircraft to follow between the two locations. Nearby is an omnirange station 13 which broadcasts signals receivable by an aircraft flying along the course 12. A compass card 14 circumscribes the location 10 on the chart. On it, magnetic north is at zero degrees. On the chart 9 shown in FIG. 1, the flight line 12 is at an angle of 43° relative to magnetic north, as shown by the compass card 14.

Similar compass cards 15 and 16 circumscribe the locations 11 and 13, respectively.

Figure 4:
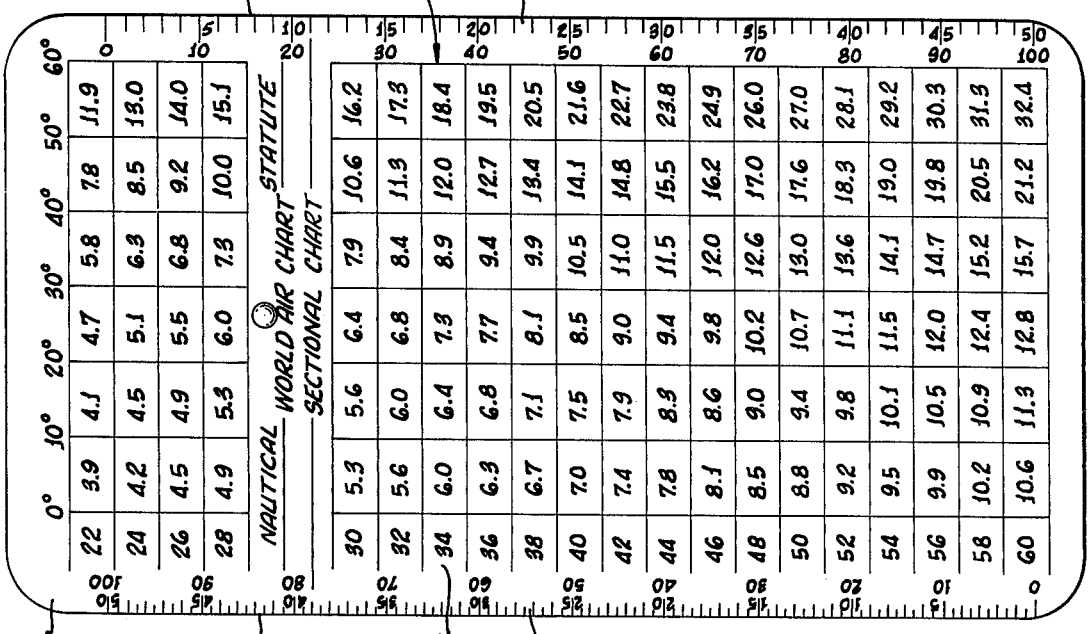
FIG. 4 is a bottom plan view of the device of FIG. 2.
Figure 3:
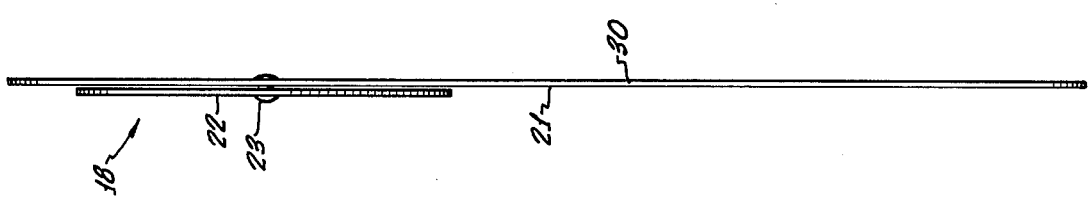
FIG. 3 is a side elevational view of the device of FIG. 2.
Figure 2:
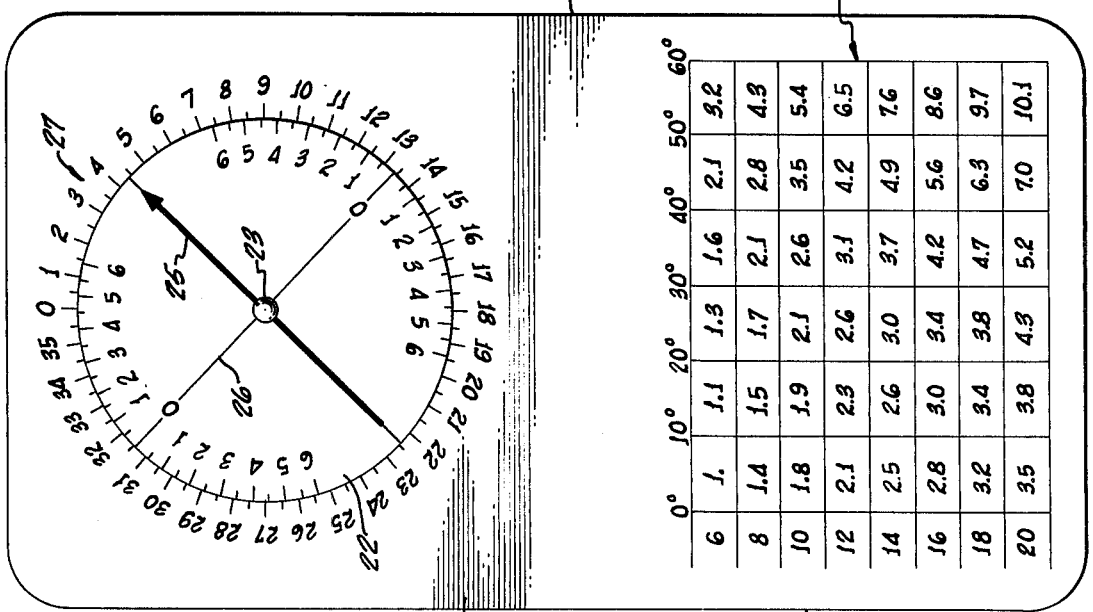
FIG. 2 is a top plan view of the indicating device of the invention.

One flying from location 10 to location 11 can ascertain his ground speed by use of the chart 9, together with a pocket-size indicating device 18, shown in FIGS. 2, 3 and 4. The device 18 is made up of a sheet 21, appropriately of plastic, with a rotor 22 mounted on its obverse surface on a pin 23. A table 24 appears at the lower portion of the obverse surface and is continued on the reverse side of the sheet 21, as shown in FIG. 4. The rotor 22 is circular and divided into quadrants by a line 25 which passes through the center of the rotor and has an arrowhead at one end, as well as a second line 26 through the center of the rotor and perpendicular to the line 25. Around the rotor 22, with its center coincident with the axis of rotation of the rotor, is a compass card 27, divided, of course, into segments corresponding to the degrees in a compass.

In use of the device 18, the rotor 22 is set so that the line 25 has its arrowhead end positioned at the marking on the compass card 27 corresponding to the bearing of the course 12. In the example shown, the end of the line on the rotor 22 is set at 43 on the compass card 27 because the course 12 is at 43° relative to magnetic north in accordance with what is indicated on the chart 9. The position of the transverse line 26 of the rotor 22 with respect to the compass card 27 then gives the direction of a line perpendicular to the course 12. Thus, the line 26 shows that a line perpendicular to a course at 43° to magnetic north will extend through the compass card 27 at 313°. The left-hand end of the line 26 is used for this reading, as the device is shown in FIG. 2, because the course 12 is to the left of the omnirange station 13 on the chart 9.

With this information, the navigator provides a line 28 on the chart 9 from the omnirange station 13 through the 313° point on the compass card 16 and out to intersect the course line 12. Ordinarily, the line 28 will be drawn on the chart 9, but it can be merely indicated by a straight edge. The line 28 then is scaled, using the scale value of the chart 9, to obtain the perpendicular distance from the course 12 to the omnirange station 13. Conveniently, a distance scale 29 is included along the two longitudinal side edges 30 and 31 of the sheet 21 on its reverse surface adjacent the continuation of the table 24. The edges are straight and can be used in producing the line 28 as well as measuring it. In the example illustrated, scaling the line 28 shows that there is a perpendicular distance of 34 miles between the course line 12 and the omnirange station 13.

Next, as the airplane is flown along the course 12, the table 24 is consulted along the horizontal column identified by the numeral 34 in the left-hand portion of the table. This is the column 32 indicated in FIG. 4, corresponding to the distance of 34 miles perpendicularly between the course line 12 and the omnirange station 13. From the table 24, the navigator is advised of the distances along the course 12 between adjacent angles of 10° increments from the omnirange station 13. As signals are received from the omnirange station 13, the elapsed time in passing through these 10° increments is noted. As shown by the table 24, when the airplane travels along course 12 from 60° to 50° in its angular relationship to the omnirange station 13, it then covers 18.4 miles. By observing the time to negotiate this distance, the ground speed can be ascertained because velocity is equal to distance divided by time. The table also indicates that 12 miles are traveled in passing from 50° to 40° angular displacement from the omnirange station 13, 8.9 miles in going from 40° to 30°, and so on. In each instance, the time for the passage through 10° may be noted and velocity determined. This may be done both in approaching and leaving the position of the perpendicular line 28, so that ground speed can be monitored over most of the course 12 from location 10 to location 11.

The table 24 is based upon the trigonometric relationship set out in FIG. 1. the incremental distances along the course line 12 are found by solving for one side of a right-angle triangle in which the line 28 and a segment of the line 12 are the two sides adjacent the right angle. The hypotenuse is displaced from the line 28 at a predetermined angle, conveniently selected as 10° and multiples thereof. With the length of the side defined by the line 28 being known, the distance along the course line 12 is readily found through the tangent of the angle. In obtaining the distance a, representing the increment along the line 12 between 0° and 10°, the relationship is established:

$$\tan 10° = (a/34) = 0.176$$
$$a = 6.0$$

The next incremental distance $b$, between 10° and 20° is found as follows:

$$\tan 20° = (+ b/34) = (6 + b/34) = 0.364$$
$$6 + b = 34 \times 0.364$$
$$b = 6.4$$

The next computation is made similarly:

$$\tan 30° = (+ b + c/34)(6 + 6.4 + b/34) = 0.577$$
$$c = 7.3$$

In this manner, all of the values for the table 24 may be obtained for a series of parallel lines at varying perpendicular distances from a point corresponding to the omnirange station.

It is sufficient to provide the distances for 2 mile increments from the omnirange station, starting at 6 miles, as indicated on the table 24. If necessary, it is a simple matter to interpolate to obtain the value between the readings on two adjacent lines of the table. The table is limited to a perpendicular distance of 60 miles from an omnirange station, because ordinarily one does not make use of an omnirange station at a greater distance from a course to be traversed. Similarly, what is considered to be the minimum practical distance for navigation relative to the omnirange station, as shown by the chart, is 6 miles.

In addition to the lines 25 and 26, the rotor 22 may include angular markings at 10° increments up to 60° on both sides of either end of the line 26. This is to assist the navigator in understanding the significance of the angular increments found in the table 24.

The foregoing detailed description is to be clearly understood as given by way of illustration and example only, the spirit and scope of this invention being limited solely by the appended claims.

I claim:

1. The method of determining the ground speed of an aircraft proceeding along a predetermined straight-line course within the range of a station which broadcasts signals indicating the direction from said aircraft to said station comprising the steps of determining a first distance from said station to said course along a line perpendicular to said course;

using said first distance and trigonometric relationships between said first distance, segments of said course defined by radial lines extending from said station and intersecting said course, and the angles between said radial lines and said perpendicular line for determining the distance along said course between adjacent points defining the ends of one of said line segments;

traversing said course between said points and observing the time required to traverse the distance between said points;

and then dividing said distance by said time to thereby obtain the velocity of said aircraft.

2. The method as recited in claim 1 in which said course and said station are indicated on an aeronautical chart, and, for determining said distance from said station to said course, including the steps of providing on a rotor rotatably mounted on a compass card a first indicia for indicating a first direction and a second indicia for indicating a second direction perpendicular to said first direction, setting said first indicia at the position on said compass card corresponding to the bearing of said course, observing the bearing of said second indicia, indicating a line on said aeronautical chart extending from said station to said course at the bearing of said second indicia, and scaling said line for thereby determining said distance.

3. The method of determining the ground speed of an aircraft proceeding along a predetermined straight-line course having a predetermined direction, said course being within the range of a station which broadcasts signals indicating the angular direction between said aircraft and said station, comprising the steps of on an indicating device having a first element having indicia thereon designating angular positions around a circle, a second element, and means connecting said second element to said first element for relative rotation of said first and second elements about an axis coincident with the center of said circle, providing first indicia on said second element indicating a first direction, and second indicia on said second element indicating a second direction at 90° with respect to said first direction, setting said first indicia of said second element at an angular position relative to said first element, as indicated by said indicia on said first element, which corresponds to said direction of said course, observing the angular position of said second indicia on said second element, as indicated by said indicia on said first element, indicating on an aeronautical chart which includes said course and said station a line extending from said station to said course at an angular direction corresponding to said angular position of said second indicia on said second element, thereby indicating on said chart a line segment from said station which is perpendicular to said course and has one end at said station and the other end at an intersection with said course, scaling said line segment between said ends thereof so as to determine the distance between said station and said course along said line segment, using said distance and trigonometric relationships between said distance, segments of said course defined by radial lines extending from said station and intersecting said course, and the angles between said radial lines and said perpendicular line segment for determining the incremental distance along said course between adjacent points defining the ends of one of said course segments, then flying said aircraft along said course between said positions, and simultaneously determining the time required to travel between said positions, and then dividing said distance by said time to obtain the ground speed of said aircraft.

4. The method as recited in claim 3 including the step of preparing a table indicating distances between selected angular positions along first lines at predetermined spaced distances from a predetermined point, which lines are parallel to each other and perpendicular to a second line passing through said point, and, for determining said incremental distances, selecting on said table a predetermined distance corresponding to the distance indicated between said ends of said line segment indicated on said chart, whereby the distances indicated between said selected angular positions on said table correspond to distances between said angular positions relative to said station along said course.

5. The method as recited in claim 4 in which said angular positions are at 10° increments.

6. The method as recited in claim 5 in which said 10° increments extend from 0° to 60°.

7. The method as recited in claim 4 in which said predetermined spaced distances of said first lines correspond to two-mile increments from said predetermined point.

8. The method as recited in claim 7 in which said 2-mile increments extend from 6 to 60 miles.

9. A device for use in determining the distance traveled by an aircraft comprising a first member having indicia thereon designating angular positions around a circle, a second member, means connecting said second member to said first member for rotation of said second member relative to said first member about an axis coincident with the center of said circle, said second member having first indicia thereon indicating a first direction, and second indicia thereon indicating a second direction at 90° with respect to said first direction, and table means indicating distances of line segments along a plurality of parallel first lines said line segments being defined by the intersection of radial lines extending from a point spaced from said first lines at predetermined angular relationships, and said first lines, as a function of the distance from a particular one of said first lines to said point and said predetermined angular relationships.

10. A device as recited in claim 9 in which said second member is circular, said first indicia is a first diametrical line on said second member, and said second indicia is a second diametrical line on said second member.

11. A device as recited in claim 10 in which said first member is planar, said table means being a table inscribed on said first member.

12. A device as recited in claim 11 in which said first member is a substantially flat sheet, said second member being in juxtaposition with one side of said sheet, said table being inscribed on said sheet with a first portion thereof being on said one side adjacent said second member, and a second portion thereof on the opposite side of said sheet.

13. A device as recited in claim 10 in which said first member includes a straight edge, and including a scale along said edge corresponding to the scale of an aeronautical chart for permitting the scaling of such a chart.

* * * * *